July 7, 1959 C. H. HAYNES 2,893,762
WELDING STUD
Filed Dec. 29, 1953

INVENTOR.
Clyde H Haynes

United States Patent Office 2,893,762
Patented July 7, 1959

2,893,762
WELDING STUD

Clyde H. Haynes, Elyria, Ohio, assignor to Gregory Industries, Inc., Detroit, Mich., a corporation of Michigan Application December 29, 1953, Serial No. 401,029

3 Claims. (Cl. 287—20.2)

This invention relates to studs for welding and in particular to the fluxing of the studs.

Past experience shows that it is necessary to provide a flux on the welding end of a stud which is to be end welded to a plate. Several methods for securing the flux to the end of a stud have been devised, some of which are in actual production. Although these present designs are satisfactory for a majority of studs, there are some studs which can be more easily manufactured by the present designs.

One of the objects of the invention is to provide the welding end of a stud with a screen of flux material covering at least a portion of the welding end.

Another object of the invention is to provide an economical and easily manufacturable stud with a flux screen on the welding end thereof.

A further object of the invention is to provide a welding stud with a welding end having a screen of flux material covering at least a portion of the welding end and a portion of the stud overlying the screen for holding it on the welding end.

Further objects and a better understanding of the invention are apparent from the following description and claims when taken in conjunction with the attached drawing in which:

The term stud is used in its broad sense to mean any member or body which has a welding end adapted to be welded to another body or a plate by means of stud welding. The present studs may be used in any of the various types of stud-welding machinery now on the market, such for example, that disclosed in Patent No. 2,413,189 issued to Ted Nelson, December 24, 1946.

Figure 1:
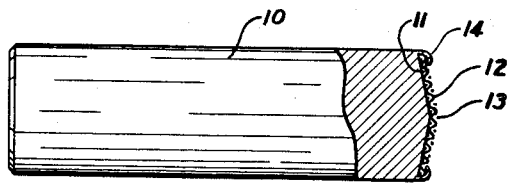
Figure 1 is a side view partly in cross section of a welding stud.
Figure 2:
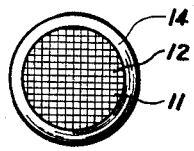
Figure 2 is an end view of the welding stud of Figure 1.

Referring to Figure 1, the stud for welding comprises a body 10 of weldable material, such for example, steel. This body 10 has a weldable end 11 which is ultimately affixed or welded to a plate or other member The stud is fluxed by covering at least a portion of the welding end 11 with a screen 12 of flux material. In this particular instance the welding end 11 is pointed to provide a centering point 13 and has a screen-overlying portion 14 which holds the screen 12 on the welding end 11. In actual practice round studs would be made by boring into the end of the stud to form a wall defining a recess to receive the screen 12. The peripheral or circumferential wall would then be rolled or crimped over at least a part of the periphery of the screen 12 to hold the screen in the recess.

Figure 3:
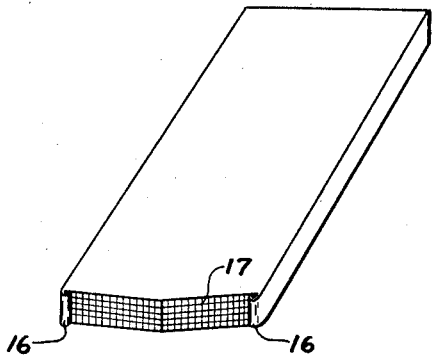
Figure 3 is a pictorial view illustrating a modification of the invention.
Figure 4:
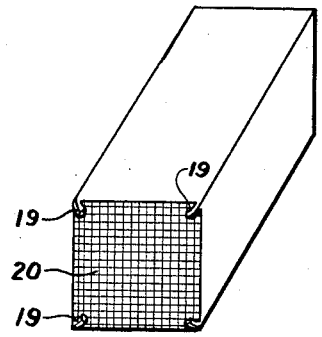
Figure 4 is a pictorial view illustrating a modification of the invention.
Figure 5:
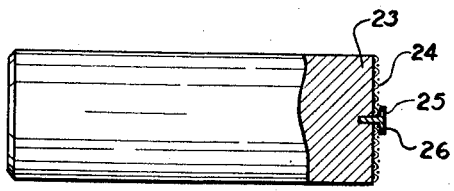
Figure 5 is an elevation partly in cross section of another modification of the invention.

In Figures 3, 4 and 5, various methods of securing the screen on the welding end of the stud are illustrated. In all of these designs a portion of the stud overlies a portion of the screen to hold the screen in the welding end. For example in the rectangular stud of Figure 3 edges 16 extend beyond a screen 17 and overlie the screen to hold it on the welding end of the stud.

Figure 4 illustrates a rectangular stud in which corners 19 of the stud overlie a screen 20 to hold the screen on the welding end of the stud.

Figure 5 illustrates a stud which has a small hole centrally located in a welding end 23 thereof. A screen 24 is fastened to this welding end 23 by a small headed pin 25 which is driven through the screen and into the hole in the end of the stud. It is understood that the small pin 25 having an arc-establishing head 26 overlying the screen 24 can be an integral part of the welding end 23 of the stud. In such cases the pin or projection 25 would be formed during manufacturing as a small projection extending from the welding end 23. After the screen 24 was placed over the projection, the projection could be riveted down to form the equivalent of the pin 25 with the head 26 overlying the screen.

Throughout the various modifications illustrated in the drawings, a screen of flux material has been described as covering at least a portion of the welded end of the stud. This screen may be constructed from suitable flux material formed in a wire mesh, wire cloth, or a perforated sheet. In either case the screen would have large surface-covering area and relatively small cross-sectional area so that it will burn readily in an arc to properly flux the welding end of the stud and the plate to which it is to be welded. When steel studs are used, the screen may be made from an aluminum-wire cloth or from finely perforated relatively thin aluminum sheet since aluminum serves as a good flux in stud welding steel studs.

Although preferred designs of the invention have been described, it is understood that the meaning of the terms and the embodiments of the invention cover slight modifications which may be made without departing from the function and scope of the invention as defined in the following claims.

I claim:

1. A weldable member adapted to be end-arc-welded to work by melting an end of said member with an arc established between said end and the work and then seating said member in the melted-end material and against the work, said member having a recess in said end, a screen of flux material consisting of wire mesh having a large surface-covering area in proportion to a small cross-sectional area in said recess and covering said end surface, said member having at least a portion thereof overlying said screen at the periphery thereof and holding said screen in said recess.

2. The structure of claim 1 wherein said member and said recess and said screen are rectangular, said portions also being located at opposite ends of said recess and said screen to hold the screen in the recess.

3. A weldable member adapted to be end-arc-welded to work by melting an end of said member with an arc established between said end and the work and then seating said member in the melted-end material and against the work, a screen of flux material consisting of mesh having a large surface-covering area in proportion to small cross-sectional area covering said end surface, and means holding said screen over said end surface.

References Cited in the file of this patent

UNITED STATES PATENTS

| | | |
|---|---|---|
| 405,866 | Bayles | June 25, 1889 |
| 2,268,416 | Nelson | Dec. 30, 1941 |
| 2,402,659 | Nelson | June 25, 1946 |
| 2,413,370 | Palmer | Dec. 31, 1946 |
| 2,446,524 | Brennan | Aug. 10, 1948 |
| 2,455,244 | Evans | Nov. 30, 1948 |
| 2,462,882 | Martin | Mar. 1, 1949 |
| 2,638,525 | Candy | May 12, 1953 |
| 2,760,797 | Woodling | Aug. 28, 1956 |